United States Patent
Yau et al.

(10) Patent No.: US 11,816,630 B2
(45) Date of Patent: Nov. 14, 2023

(54) SYSTEM AND METHOD FOR DETERMINATION OF OVERSTATED PI VALUES

(71) Applicant: Walmart Apollo, LLC, Bentonville, AR (US)

(72) Inventors: Ying C. Yau, Carlsbad, CA (US); Zheyuan Chen, Carlsbad, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/224,360

(22) Filed: Apr. 7, 2021

(65) Prior Publication Data
US 2022/0327467 A1    Oct. 13, 2022

(51) Int. Cl.
| | | |
|---|---|---|
| *G06Q 10/08* | (2023.01) | |
| *G06Q 10/087* | (2023.01) | |
| *G06Q 30/0601* | (2023.01) | |
| *G06N 20/00* | (2019.01) | |
| *G06N 7/01* | (2023.01) | |

(52) U.S. Cl.
CPC ............. *G06Q 10/087* (2013.01); *G06N 7/01* (2023.01); *G06N 20/00* (2019.01); *G06Q 30/0623* (2013.01); *G06Q 30/0633* (2013.01)

(58) Field of Classification Search
CPC ............ G06Q 10/087; G06Q 30/0633; G06Q 30/0623; G06N 20/00; G06N 7/005
See application file for complete search history.

(56) References Cited

U.S. PATENT DOCUMENTS

| | | |
|---|---|---|
| 8,321,303 B1 | 11/2012 | Krishnamurthy |
| 2003/0126103 A1 | 7/2003 | Chen |
| 2014/0058794 A1* | 2/2014 | Malov .................. G06Q 10/087 705/7.31 |
| 2018/0189760 A1* | 7/2018 | Brooks .................. G06N 20/00 |
| 2019/0236485 A1* | 8/2019 | Stanley, III ........... H04L 67/303 |
| 2019/0295061 A1 | 9/2019 | Brooks |

OTHER PUBLICATIONS

HYPERSONIX; "AI in Inventory Management: Putting AI to Work to Optimize your Inventory"; <https://hypersonix.ai/resources/ai-in-inventory-management/>; Oct. 23, 2020; 5 pages, retrieved from Internet Archive Wayback Machine <http://web.archive.org/web/20201023023920/https://hypersonix.ai/resources/ai-in-inventory-management/> on Jun. 24, 2021.

* cited by examiner

*Primary Examiner* — Peter Ludwig
*Assistant Examiner* — Reva R Moore
(74) *Attorney, Agent, or Firm* — Fitch, Even, Tabin & Flannery LLP

(57) ABSTRACT

An out-of-stock indicator is received that indicates a product is out-of-stock or believed to be out-of-stock. Information about the features of the products and store are obtained or determined. The features are applied to a first machine learning model, which yields a probability that the item is out-of-stock. The obtained probability is compared to a threshold, and if the probability value is above a threshold, then the PI value is adjusted. If not above the threshold, then scans are monitored for out-of-stock conditions, and some time later the features will be applied to a different model, and the above-process repeated. In aspects, this process occurs over a certain time period or until the PI is adjusted.

16 Claims, 6 Drawing Sheets

SYSTEM AND METHOD FOR DETERMINATION OF OVERSTATED PI VALUES

TECHNICAL FIELD

The technical field relates to the determination of overstated perpetual inventory (PI) values.

BACKGROUND

Perpetual inventory (PI) is a numerical value representing the number of products in a store. PI values are used by accounting or replenishment systems for various purposes. For example, PI values are used to reorder products.

PI values can become inaccurate in a number of different ways over time. One of the ways that a PI value becomes inaccurate is that it becomes "overstated." An overstated PI means that the PI value shows a positive value, but the actual value is less, often zero. In other words, when a PI value is overstated then it is believed (by the store) that there are more products in the store than actually exist in the store. This can lead to not ordering replacement products when needed, which, in turn, might lead to not being able to supply a customer with a product when the customer needs the product.

BRIEF DESCRIPTION OF THE DRAWINGS

The above needs are at least partially met through the provision of approaches for the determination of overstated perpetual inventory (PI) values, wherein.

Figure 1:
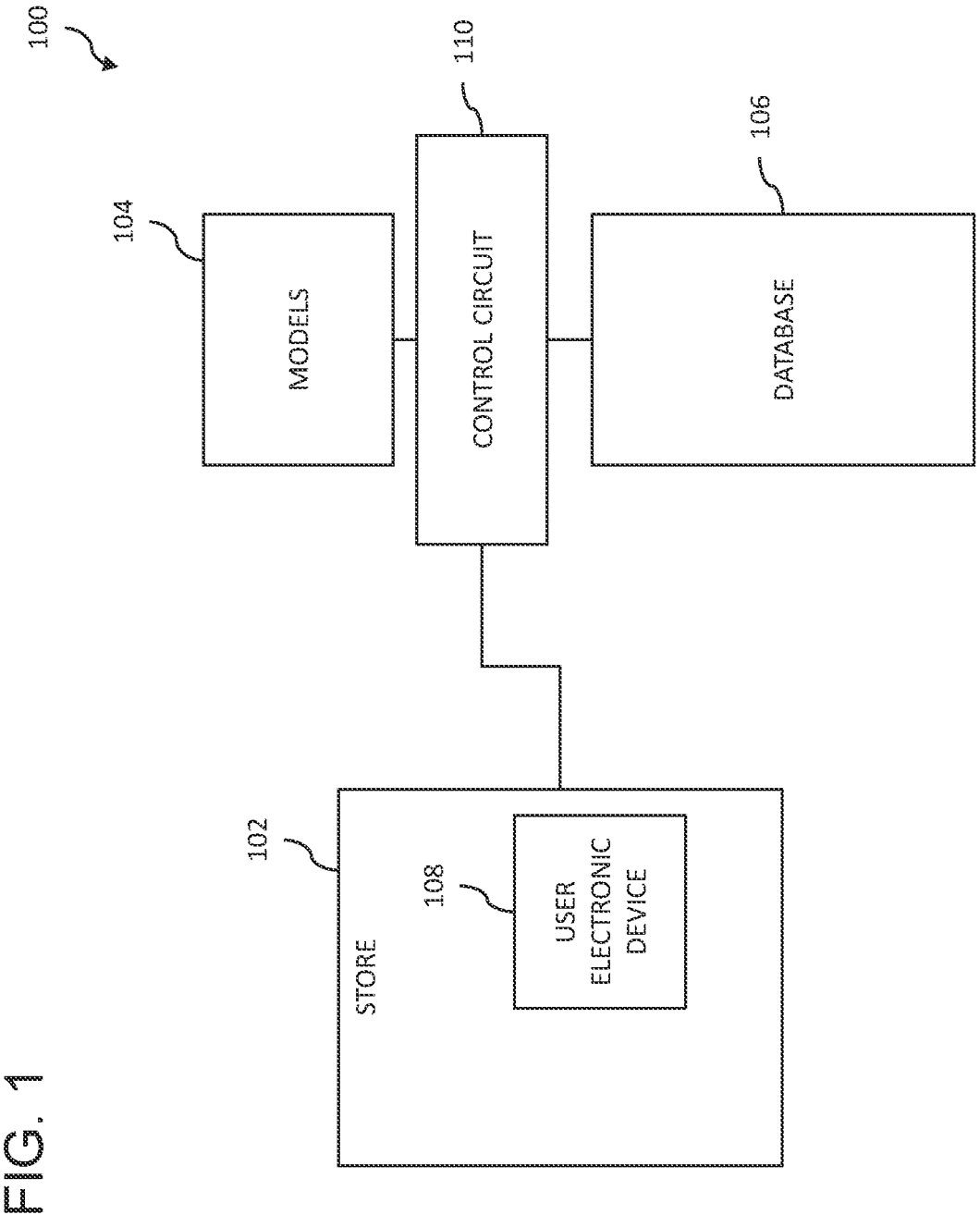
FIG. 1 comprises a diagram of a system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The invention relates to adjusting perpetual (PI) inventory values when there is an overstated PI condition in a store. Overstated PI occurs when the PI value is positive, but the actual inventory value is less than the PI value, for instance zero. An out-of-stock indicator is received that indicates a product is out-of-stock. For example, the indicator can be obtained from a store employee using a scanner to scan a product label (e.g., on a shelf) to indicate the employee believes the item is out-of-stock. Based on the scan, information about the features of the products and store is obtained or determined. Features of the product might include product type or storage requirements, and information about the store might include the store location, whether the store follows correct procedures, or store performance. The obtained or determined features are applied to a first machine learning model, which yields a probability that the item is out-of-stock. The obtained probability is then compared to a threshold, and if the probability value is above a threshold, then the PI value is adjusted. If not above the threshold, then scans are monitored for out-of-stock conditions, and some time later (e.g., 24 hours later) the features will be applied to a different model, and the above-process repeated. In aspects, this process occurs over a certain number of days, such as a week or until the PI is adjusted.

In other examples, an employee enters information that a product is out-of-stock, for example, by scanning a shelf label. Alternatively, the employee may manually enter the out-of-stock indication, for example, into a smartphone type device. It will be appreciated that an out-of-stock scan is not necessarily equal to "real" or "true" out-of-stock (PI is 0); the reason can be items are disposed at other locations, a false out-of-stock scan, etc. Based on the scan (or other indication), information about the features of the products and store are obtained or determined. Features of the product might include the product type or storage requirements, recent sales and receiving changes, and information about the store might include the store location, whether the store follows correct procedures, or store key performance indicator(s). A database may store the static features, and a compute engine may generate dynamic features given a store and item in real-time.

A determination is made as to whether the item is on a monitor list (a list of products being monitored for potentially being out-of-stock given that an out-of-stock scan has been observed for this item before but PI hasn't been adjusted) when an out-of-stock scan is received. If it is not on the list, the features are applied to a first machine learning model, which yields a probability that the item is out-of-stock. The obtained probability is compared to a threshold, and if the probability value is above a threshold, then the PI value is adjusted. If not above the threshold, then the item is monitored for future events (e.g., another out-of-stock scan, sales). While waiting for further events, the item will be periodically (e.g. 24 hours) be applied to a sequence of models trained for various "age" of items with an out-of-stock scan, and the above-mentioned process repeated. This occurs over a certain number of days, such as 16 days, until the PI is adjusted or a sales or receiving event happens, which indicates the availability issue has been resolved or falsely accused in the first place.

If the product is initially on the list, then the same process is performed, but with a second model that is different than the first model. In aspects, the second model has been trained by data, which includes items with same "age" from its initial out scan (e.g., 24 hours or 48 hours, to mention two examples).

A suite of models is used. If used by a retailer, the models are used chain-wide (across many stores), but, in aspects, each represents a particular department, area, or sales or product grouping. For example, a produce department model may be used chain-wide and model all types of produce (e.g., fruits, vegetables). In other aspects, the suite includes a different model for each day. In this example, 16 models exist, one for each of the 16 days.

The models are initially trained with historical data. However, as the models are used, new data is generated as customers purchase products, as products change, or as other events occur. This data can be reflective of new customer trends such as new sales patterns. The new data can be further used to refine the models.

The PI value is used to perform or initiate the performance of various physical actions such as re-ordering the product, shipping the product, moving the product within the store, alerting store employees, or instructing a manufacture to initiate the manufacture of a product. Other examples are possible.

The present approaches are machine learning (ML)-based, dynamic, event driven, and provide a real-time overstated PI detection an adjustment system. This machine learning framework dynamically classifies whether or not merchandise that receives an out-of-stock signal is indeed out-of-stock (the PI should have been 0), even though it carries a positive perpetual inventory. In contrast to previous static one-shot approaches (in which a one-time out-of-stock class is the final model result, the ML approaches provided herein systematically and iteratively process and monitor out-of-stock conditions. Once a probability is generated, one of two scenarios can occur: (1) if the probability meets or exceeds a predetermined threshold, then the PI is determined to be overstated and will be down-adjusted to zero (i.e., merchandise is out-of-stock); (2) if the probability falls below the predetermined threshold, then the "out-of-stock" signal will continue to be monitored and will be scored every 24 hours or every time there is a new event of items with models trained for that specific age of examples to generate an updated probability unless an availability issue resolved event (such as sales often product indicating actual availability) is received, or another out-of-stock signal is received that immediately triggers the model to generate an updated probability. This iterative, dynamic process of generating out-of-stock probabilities that either determine a PI adjustment action or continue to monitor for out-of-stock signals until the a until the arrival of a new event to trigger model scoring.

In many of these embodiments, a system for maintaining stock levels in a retail store by correcting over-stated perpetual inventory (PI) values includes a retail store, a plurality of machine learning models, a database, a user electronic device, and a control circuit.

The retail store includes product displays that are configured to present products to customers. Each of the machine learning models is different from the others.

The user electronic device is configured to obtain an out-of-stock indicator, the out-of-stock indicator indicating that a product is out-of-stock. The database is configured to store mapping information that maps out-of-stock indicators to features of the product and features of the store. The database also stores a perpetual inventory (PI) value of the product.

The control circuit is coupled to the user electronic device, the plurality of machine learning models, and the database. The control circuit is configured to receive the out-of-stock indicator from the user electronic device and responsively determine features of the product and features of the store by using the mapping information in the database.

The control circuit is further configured to, at a sequence of different times over a predetermined time period, and until the PI value for the product is adjusted or the predetermined time period has expired: (1) select a model from the plurality of models, wherein a different model is selected at each of the different times; (2) apply the determined features of the product and the features of the store to the selected model and responsively receive an out-of-stock probability from the selected model, the out-of-stock probability indicating probability that the product is actually out-of-stock; (3) compare the out-of-stock probability to a threshold; and (4) when the probability value is at or above the threshold, perform an adjustment of the PI value for the product, the adjustment being effective to correct for an overstated PI condition of the product.

The adjusted PI value is utilized to perform an action, the action being one of: re-ordering products from a distributor, the products being shipped to the retail store, and re-stocking the products at the product displays in the retail store. Other examples of actions are possible.

In aspects, the user electronic device is a product scanner. Other examples of electronic devices are possible.

In other examples, the predetermined time period is a plurality of days. Other examples of time periods are possible.

In examples, the model is selected also based upon whether a product is on a list of products that are being monitored. If the model is not on the list, then no model is selected.

In other examples, the indicator is obtained by scanning a shelf label. Other indicators may also be obtained.

In still other examples, the product features comprise product brand, size, or storage arrangements. In yet other examples, the store features comprise size of the store, location of the store, or store performance.

In other aspects, the product displays include shelving units. Other examples of product displays are possible.

In yet other examples, the plurality of machine learning models are trained prior to use. In still other examples, the plurality of machine learning models change over time after training has occurred.

In others of these embodiments, a method for maintaining stock levels in a retail store by correcting over-stated perpetual inventory (PI) values includes providing a retail store, the retail store including product displays that are configured to present products to customers. A plurality of machine learning models are also provided. Each of the machine learning models is different from the others.

Additionally, a user electronic device that is configured to obtain an out-of-stock indicator is provided. The out-of-stock indicator indicates that a product is out-of-stock.

Further, a database that is configured to store mapping information that maps out-of-stock indicators to features of the product and features of the store is provided. The database also stores a perpetual inventory (PI) value of the product.

At a control circuit, the out-of-stock indicator from the user electronic device is received. The control circuit responsively determines features of the product and features of the store by using the mapping information in the database.

At a sequence of different times over a predetermined time period, and until the PI value for the product is adjusted or the predetermined time period has expired, the control circuit: (1) selects a model from the plurality of models, wherein a different model is selected at each of the different times, (2) applies the determined features of the product and the features of the store to the selected model and responsively receive an out-of-stock probability from the selected model, the out-of-stock probability indicating probability that the product is actually out-of-stock; (3) compares the out-of-stock probability to a threshold; and (4) when the probability value is at or above the threshold, performs an adjustment of the PI value for the product, the adjustment being effective to correct for an overstated PI condition of the product.

The adjusted PI value is utilized to perform an action. The action is one of: re-ordering products from a distributor, the products being shipped to the retail store, and re-stocking the products at the product displays in the retail store. Other examples of actions are possible.

Referring now to FIG. 1, a system 100 for maintaining stock levels in a retail store by correcting over-stated perpetual inventory (PI) values includes a retail store 102, a plurality of machine learning models 104, a database 106, a user electronic device 108, and a control circuit 110.

The retail store 102 is any type of retail establishment providing products and/or services to customers such as a retail store selling products (or services) to customers, a distribution center, or a market to mention a few examples. The retail store includes product displays that are configured to present products to customers. In other aspects, the product displays include shelving units that present the products to customers.

The plurality of machine learning models 104 are any type of machine learning model or structure. Each of the machine learning models are different from the others. The plurality of machine learning models 104 are trained prior to use, and the plurality of machine learning models 104 change or are periodically refined over time to make the models 104 more accurate. The models 104 may be grouped into different sets based, for example, on department of the store 102. For instance, a first group of models 104 may relate to the produce department and a second group of models 104 may relate to the meat department. Model selection may include selecting the correct group of models (meat department models or produce department models) and if the approach is implemented over several days, the model for the correct day (module for day 1, model for day 2, and so forth) is also selected. It will be appreciated that model selection is an affirmative step whereby the control circuit 110 makes a decision based upon a type of product (e.g., as indicated by a scanned code) and the timing (e.g., day 1, 2, etc.). Another part of the model selection may be determining whether the product is on monitored list of products (e.g., products to be monitored may be manually or automatically entered onto the list based upon a predetermined set of criteria, and model selection may occur only when the product is on the list).

The machine learning models 104 may be created or trained according to machine learning algorithms. In aspects, the machine learning algorithms perform pattern recognition on the training data to build the model. Examples of machine learning algorithms included artificial neural network/backpropagation-based algorithms, regression-based algorithms, and decision tree-based algorithms. Other examples of algorithms are possible. The models 104 and/or algorithms may be stored in the database 106, at any other location (e.g., some other electronic device or memory) or in any other combination of locations.

The models 104 may be of any structure or combination of or usage of structures such as files, data structures (within the files), code, pseudocode, graphs, vectors, weightings, equations, mathematical constructs, or algorithms to mention a few examples. These structures, in one example, are neural networks.

As mentioned, in one specific example, the machine learning models 104 are neural networks. The neural networks can have various layers and each of the layers performs a specific function. In some aspects, these layers form a graph structure with vectors or matrices of weights with specific values. For instance, an input layer receives input signals or data and transfers this information to the next layer. One or more other layers perform calculations or make determinations on or involving the data. An output layer transmits the result of the calculations or determinations. If the network is a convolution neural network (CNN), one or multiple convolutional layers are included in the network structure. In aspects, the convolutional layers apply a convolutional function on the input before transferring it to the next layer.

The database 106 is any type of electronic memory device or combination of electronic memory devices that store information. The database 106 is configured to store mapping information that maps out-of-stock indicators to features of the product and features of the store. The database 106 also stores a perpetual inventory (PI) value of the product.

The user electronic device 108 is any type of device for receiving an indication that a product is out-of-stock. In one example, the user electronic device 108 is a product scanner. Other examples are possible. In aspects, the user electronic device 108 is configured to obtain an out-of-stock indicator and the out-of-stock indicator indicates that a product is out-of-stock. In other examples, the indicator is obtained by scanning a shelf label. Other indicators may also be obtained or received from other sources.

The control circuit 110 is coupled to the user electronic device 108, the plurality of machine learning models 104, and the database 106. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here.

The control circuit 110 is configured to receive the out-of-stock indicator from the user electronic device 108 and responsively determine features of the product and features of the store by using the mapping information in the database 106. In still other examples, the product features comprise product brand, size, or storage arrangements. In yet other examples, the store features comprise size of the store, location of the store, or store performance. In one specific example, a product number obtained from the scan is mapped to product features including the brand, size, and how presented in the store. These product features are retrieved from the database 106 and applied to selected ones of the models 104 as described elsewhere herein. The mappings can be implemented in any appropriate data structure such as a mapping table. Other examples are possible.

The control circuit 110 is further configured to, at a sequence of different times over a predetermined time period, and until the PI value for the product is adjusted or the predetermined time period has expired: (1) select a model from the plurality of models 104 with a different model is selected at each of the different times; (2) apply the determined features of the product and the features of the store 102 to the selected model 104 and responsively receive an out-of-stock probability from the selected model, the out-of-stock probability indicating probability that the product is actually out-of-stock; (3) compare the out-of-stock probability to a threshold; and (4) when the probability value is at or above the threshold, perform an adjustment of the PI value for the product, the adjustment being effective to correct for an overstated PI condition of the product. In examples, the predetermined time period is a plurality of days. Other examples are possible.

Model selection can be made based on a variety of different factors. For example, if the approach is performed over a multiple day period, a different model is selected based upon the day. Day 1 may have a day 1 model (trained on data of that age), day 2 may have a different model (trained on data of that age), and so forth. Other examples are possible.

In other examples, a determination is made as to whether the item is on a monitor list (a list of products being monitored for potentially being out-of-stock). If it is on the list, the features are applied to a first machine learning model, which yields a probability that the item is out-of-stock. In other words, the model is not selected unless the product is on a list of products that are monitored.

Preprocessing of the data before it is applied to the model may also occur. For example, the data may be processed into various forms such as vectors so that it can be applied to a model.

Once adjusted, the adjusted PI value is utilized to perform an action, the action being one of: re-ordering products from a distributor, the products being shipped to the retail store, and re-stocking the products at the product displays in the retail store. Other examples of actions are possible. The products may be shipped to the retail store 102, unloaded at a dock at the retail store 102, placed in temporary storage at the retail store 102, and then moved through the store to the shelving units to be displayed to customers. The moving may be accomplished manually by employees moving carts, or automatically by automated vehicles.

Figure 2:
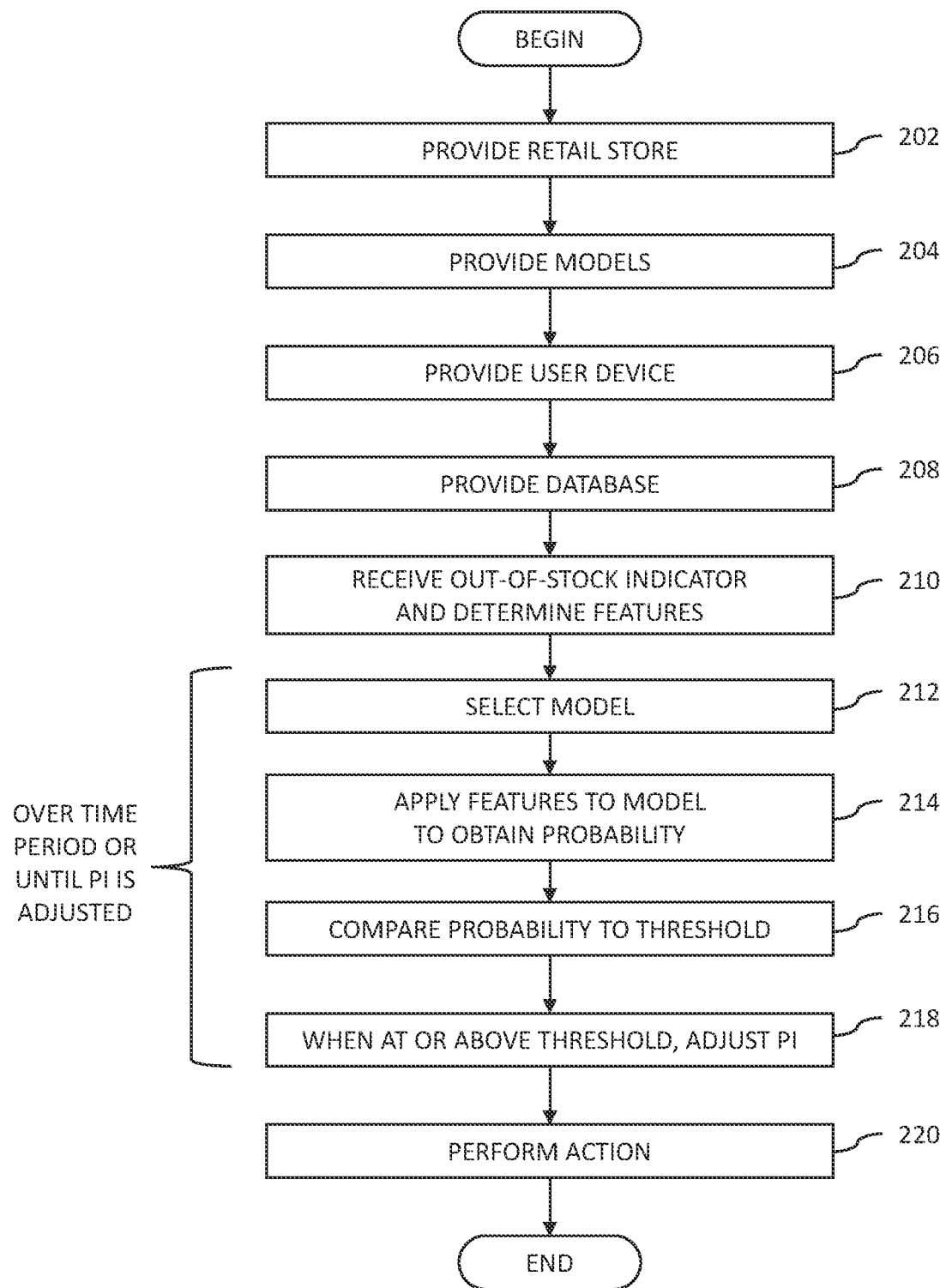
FIG. 2 comprises a flowchart as configured in accordance with various embodiments of these teachings.

Referring now to FIG. 2, and approach for maintaining stock levels in a retail store by correcting over-stated perpetual inventory (PI) values is described.

At step 202, a retail store is provided. The retail store includes product displays that are configured to present products to customers. The retail store may be any type of retail store, distribution center, warehouse store, or market.

At step 204, a plurality of machine learning models is also provided. Each of the machine learning models is different from the others. For example, each of the models is created using specific (and different) data sets. A data set appropriate for a day 1 may be used to train a first model, that is, having data that is of a certain age (e.g., taken on a Monday). On the other hand, a data set appropriate for a day 2 may be used to train a second model, that is, having data that is of a different age (e.g., covering Tuesdays). It will be appreciated that these are examples only and that other examples are possible.

At step 206, a user electronic device that is configured to obtain an out-of-stock indicator is provided. The out-of-stock indicator indicates that a product is out-of-stock. The user electronic device is eventually used to obtain the indicator or to somehow indicate to the system that a product is believed to be out-of-stock.

At step 208, a database that is configured to store mapping information that maps out-of-stock indicators to features of the product and/or features of the store is provided. The database also stores a perpetual inventory (PI) value of the product. For example, a scanned product number may map to product brand information.

At step 210 and at a control circuit, the out-of-stock indicator from the user electronic device is received. The control circuit responsively determines features of the product and features of the store by using the mapping information in the database. The indicator may be the scanned product number, which indicates a belief that the product is out-of-stock.

At a sequence of different times over a predetermined time period, and until the PI value for the product is adjusted or the predetermined time period has expired, the control circuit performs several steps 212, 214, 216, and 218.

At step 212, the control circuit selects a model from the plurality of models, and a different model is selected at each of the different times. Model selection may be made, for example, based on the current day or date. For instance, at a first day, a first model is selected. On a second day, a second model may be selected.

At step 214, the control circuit applies the determined features of the product and the features of the store to the selected model and responsively receives an out-of-stock probability from the selected model. The out-of-stock probability indicates the probability that the product is actually out-of-stock.

At step 216, the control circuit compares the out-of-stock probability to a threshold. The threshold may be determined based on historical information.

At step 218, the control circuit, when the probability value is at or above the threshold, performs an adjustment of the PI value for the product, the adjustment being effective to correct for an overstated PI condition of the product.

At step 220, the adjusted PI value is utilized to perform an action. The action is one of: re-ordering products from a distributor, the products being shipped to the retail store, and re-stocking the products at the product displays in the retail store. Re-ordering may cause a product to be manufactured. For instance, control signals may be created that cause manufacturing devices to create or produce a product. Other examples of actions are possible.

Figure 3:
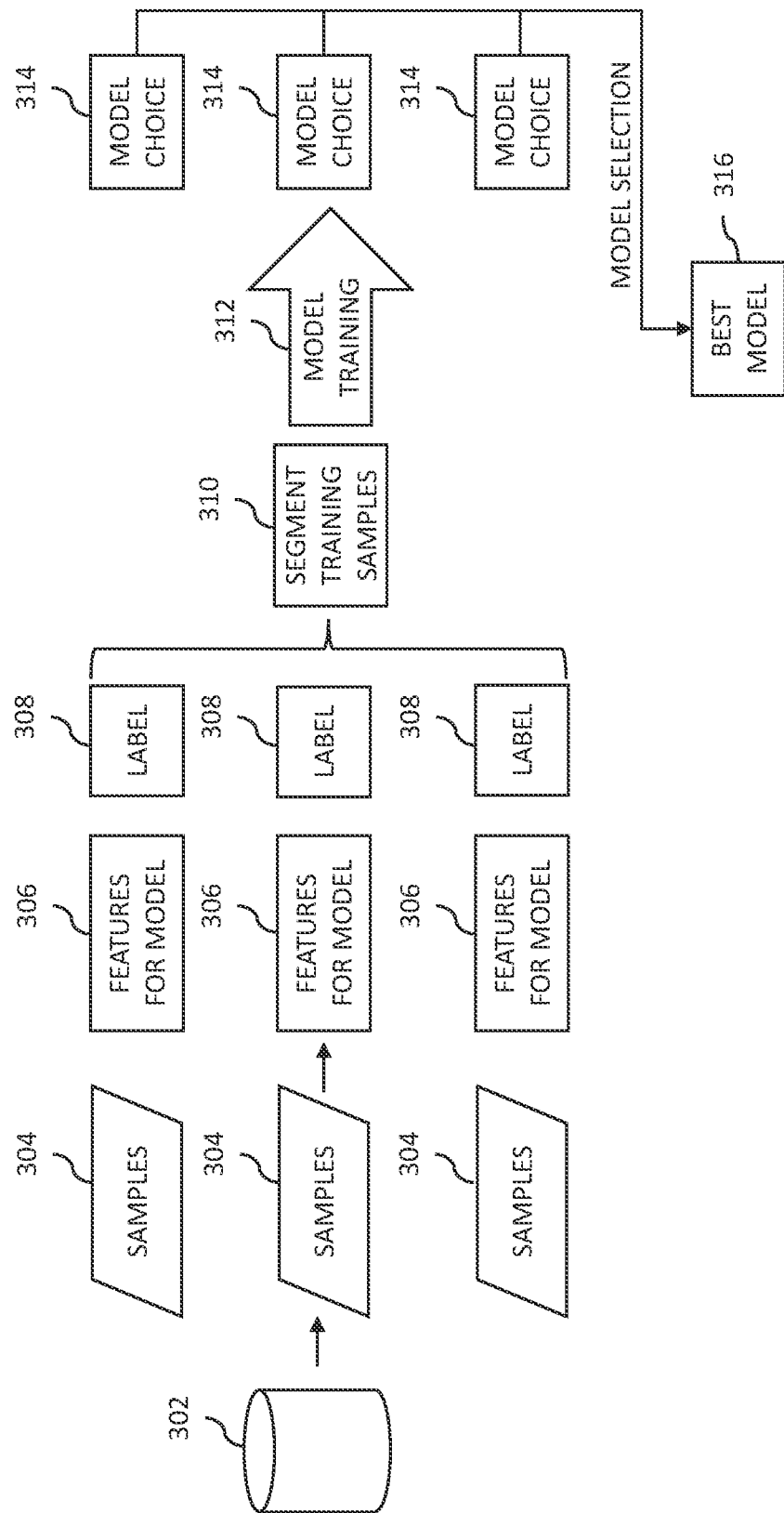
FIG. 3 comprises a flowchart as configured in accordance with various embodiments of these teachings.

Referring now to FIG. 3, one example of a model training process is described. The model training process described in FIG. 3 produces the models that form a suite of models. For example, if a model is needed for each of 16 days, then 16 models are created with a separate model used for each of the 16 days. In aspects, each of the models is different.

Various actions 302 are filtered to produce samples 304 for various days. Features 306 with labels 308 are formed. Each training sample segment has separate model training and selection. The model training and selection process is repeated for each training sample segment 310. A first model is trained with data from previous first days. Data from previous second days are used to train a day 2 model. This continues for each day so that a model that is trained with appropriate day data.

Training sample segments 310 (formed from the features 306 and the labels 308) are used in model training 310 to create a plurality of model choices 312. Various criteria (e.g., model complexity, maintainability, and available resources to mention a few examples) occurs in model selection 314 to select a best model 316. For example, the least complex model may be desired.

Figure 4:
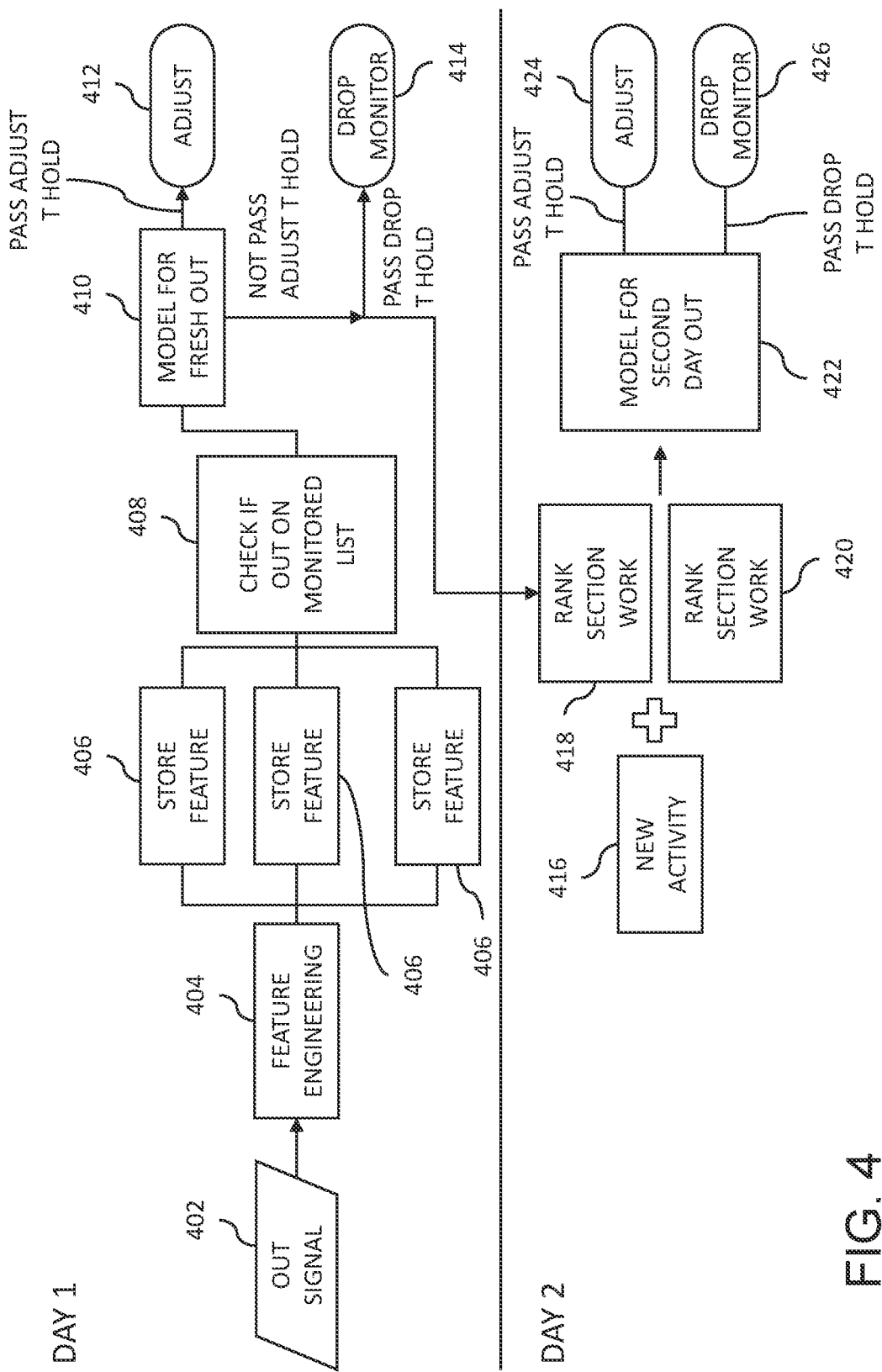
FIG. 4 comprises a flowchart as configured with various embodiments of these teachings.

Referring now to FIG. 4, one example of the execution phase using the trained models is described. In this example, the trained models have already been created (e.g., using the process of FIG. 3). An out-of-stock signal is received at step 402. The out-of-stock signal may be received from a scanning device in one example. A feature engine generates a vector at step 404 that may include store variables 406 (from a database and, in examples, including information concerning the product brand, how much the store has, which store, and so forth).

At step 408, a check is made to see whether the product is on a monitor list. At step 410 it is determined if the product is "fresh out," that is, the first time the product is determined to be out-of-stock. The vector is applied to a model to obtain an out-of-stock probability. The out-of-stock probability is compared to a threshold and if it is above the threshold, then an adjustment can be made to the PI, for example setting the PI to zero at step 412. The model may also produce a numerical value as to whether the product should be on the monitor list and a comparison can be made to a monitor threshold. If the number is above ether threshold then at step 414 the system may drop the product from the monitor list. The monitor threshold relates as to a certainty that a product should be monitored (i.e., and included in the monitor list).

At step 416, new activity (e.g., other information from store workers, another out-of-stock indicator) is received At step 418, section work is ranked. Section work may include the work performed by workers in a particular being section of the store that is ranked. At step 420, section work signal is received. For example, this may include workers searching for products and information regarding the search. This information along with other information obtained from the store database is applied as a vector at step 422 to a second model that is different than the first model. The vector is applied to a second day model to get an out-of-stock probability from the second model. The out-of-stock probability is compared to a threshold and if it is above the threshold, then an adjustment can be made to the PI, for example setting the PI to zero at step 424. The second model may also produce a numerical value as to whether the product should be on the monitor list and a comparison can be made to a monitor threshold. If the number is above the threshold then at step 426 the system may drop the product from the monitor list.

The steps 461-424 may be performed over a predetermined time period until the predetermined time period expires, the PI value is adjusted, or some other event occurs.

Figure 5:
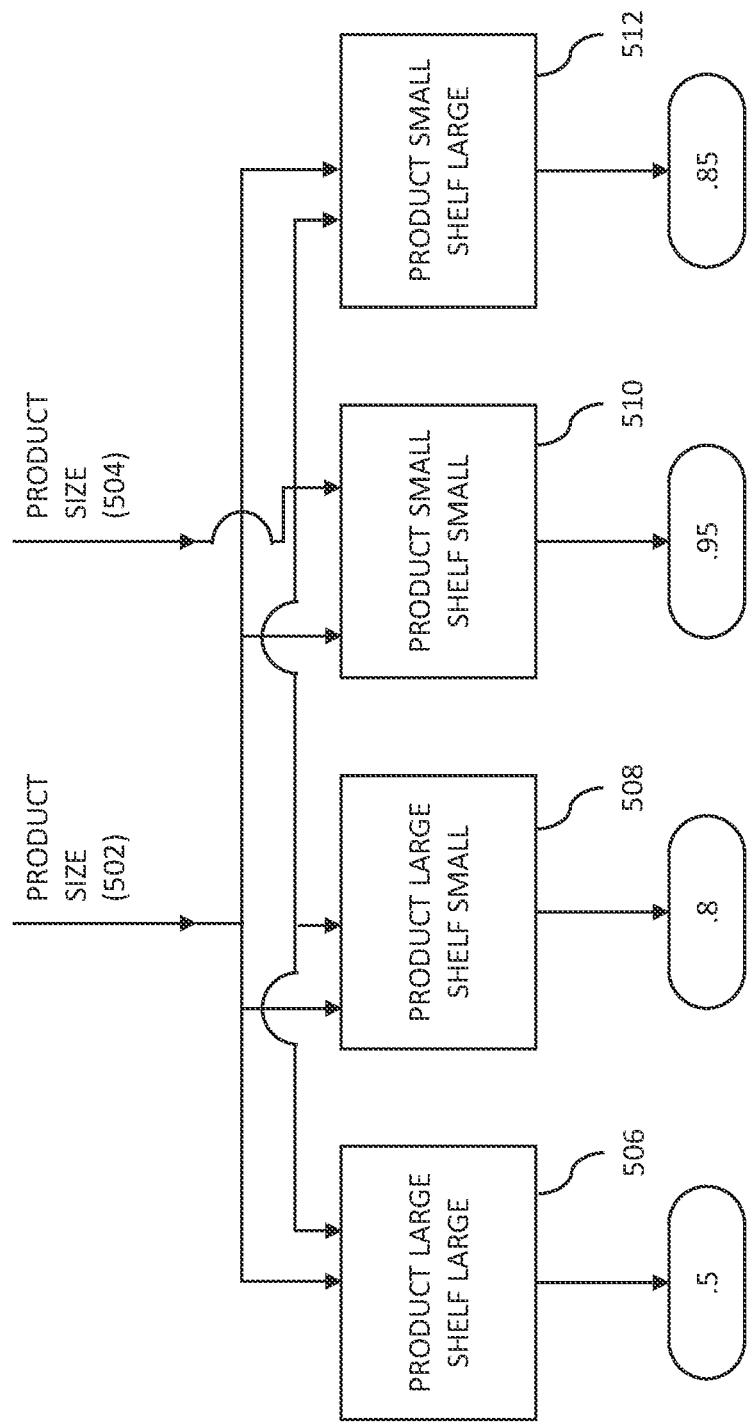
FIG. 5 comprises a flowchart as configured with various embodiments of these teachings.

Referring now to FIG. 5, one example of the functional operation of a model is described. It will be appreciated that the steps shown in FIG. 5 may be implemented as or in any type of model in any format such as a neural network. Consequently, the example of FIG. 5 describes the functions attributed to an example model. Those skilled in the art will appreciate how to implement the model as a particular structure such as a neural network.

Information including product size 502 and shelf size 504 is received. A first process or function 506 determines if the product is a large size and the shelf size is large. If these conditions are true, the probability is assigned 0.5. A second process or function 508 determines if the product is a large size and the shelf size is small. If these conditions are true, the probability is assigned 0.8. A third process or function 510 determines if the product is a small size and the shelf size is small. If these conditions are true, the probability is assigned 0.95. A fourth process or function 512 determines if the product is a small size and the shelf size is large. If these conditions are true, the probability is assigned 0.85.

Figure 6:
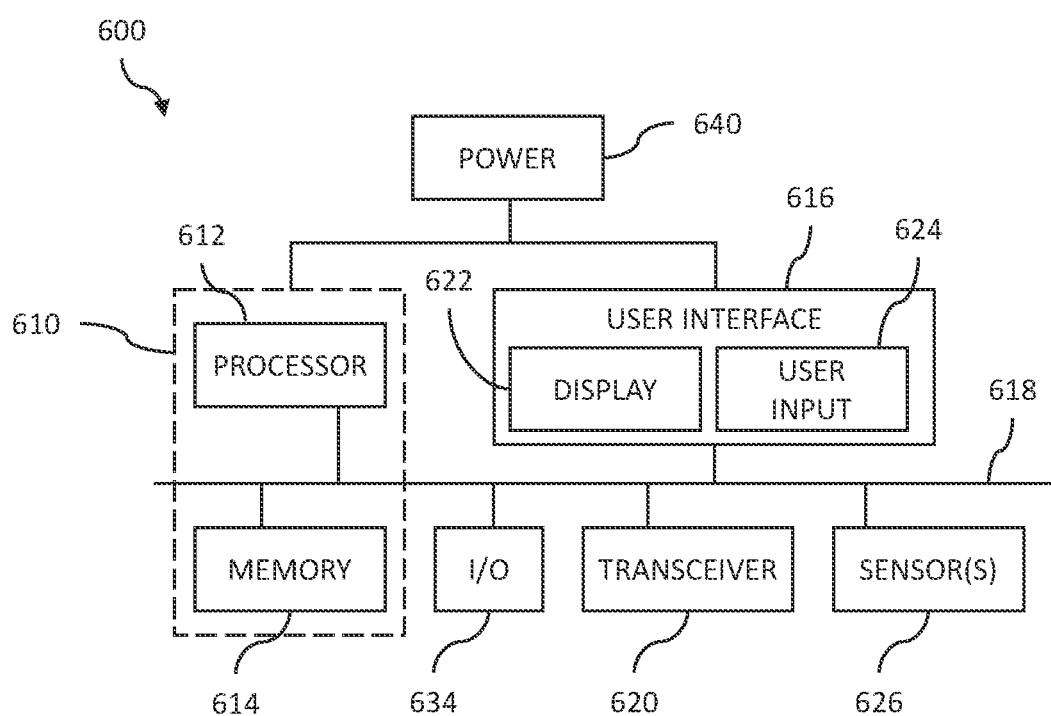
FIG. 6 comprises a diagram of a system as configured with various embodiments of these teachings.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the system 100 of FIG. 1 and/or other above or below mentioned systems or devices, or parts of such circuits, circuitry, functionality, systems, apparatuses, processes, or devices. For example, the system may be used to implement some or all of the control circuits, neural networks, platforms, one or more of the databases, and/or other such components, circuitry, functionality and/or devices. However, the use of the system 600 or any portion thereof is certainly not required.

By way of example, the system 600 may comprise a processor module 612, memory 614, and one or more communication links, paths, buses or the like 618. Some embodiments may include one or more user interfaces 616, and/or one or more internal and/or external power sources or supplies 640. The processor module 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the processor module 612 can be part of control circuitry and/or a control system 610, which may be implemented through one or more processors with access to one or more memory 614 that can store commands, instructions, code and the like that is implemented by the processor module to implement intended functionality. In some applications, the processor module and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports.

The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the processor module 612. Again, the processor module 612 can be implemented through one or more processors, controllers, central processing units, logic, software and the like. Further, in some implementations the processor module 612 may provide multiprocessor functionality.

The memory 614, which can be accessed by the processor module 612, typically includes one or more processor-readable and/or computer-readable media accessed by at least the processor module 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the processor module 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system for maintaining stock levels in a retail store by correcting over-stated perpetual inventory (PI) values, the system comprising:

a plurality of machine learning models including a first model and a second model, each of the machine learning models being structurally different from the others, the machine learning models being trained with different data prior to use according to an artificial neural network/backpropagation-based algorithm, a regression-based algorithm, or a decision tree-based algorithm;

wherein the first model and the second model are neural networks, the first model comprising a first structure including first layers and first weights, the second model comprising a second structure including second layers and second weights, the training being effective to physically change the first structure and the second structure, the trained first structure and the trained second structure being different and unique;

wherein the first model is trained only on first data having a first age or date, and the second model is trained only on second data having a second age or date, the first age or date and the second age or date being different;

a user electronic device that is configured to obtain an out-of-stock indicator, the out-of-stock indicator indicating that a product is out-of-stock in a retail store;

a database that is configured to store mapping information that maps out-of-stock indicators of the product to features of the product and features of the store, the database also storing a perpetual inventory (PI) of value of the product;

a control circuit, the control circuit coupled to the user electronic device, the plurality of machine learning models, and the database, the control circuit being configured to over a plurality of days:

receive the out-of-stock indicator from the user electronic device and responsively determine features of the product and features of the retail store by using mapping information in the database;

at a first predetermined time:

select the first model from the plurality of models;

apply the determined features of the product and the features of the retail store to the selected first model and responsively receive a first out-of-stock probability from the selected first model, the first out-of-stock probability indicating probability that the product is actually out-of-stock;

compare the first out-of-stock probability to a threshold;

when the first out of stock probability is at or above the threshold, perform an adjustment of the PI value for the product, the adjustment being effective to correct for an overstated PI condition of the product;

at a second predetermined time and when the first out-of-stock probability is below the threshold, the second predetermined time being different than and subsequent to the first predetermined time:

select the second model from the plurality of models;

apply the determined features of the product and the features of the retail store to the selected second model and responsively receive a second out-of-stock probability from the selected second model, the second out-of-stock probability indicating probability that the product is actually out-of-stock;

compare the second out-of-stock probability to the threshold;

when the second out of stock probability is at or above the threshold, perform an adjustment of the PI value for the product, the adjustment being effective to correct for an overstated PI condition of the product;

wherein the adjusted PI value is utilized to perform an action, the action being one of: re-ordering products from a distributor, the products being shipped to a retail store, and re-stocking the products at the retail store;

wherein the restocking is accomplished by using an electronic signal that is effective when applied to an automated device to control the automated device to move the products through the retail store or by instructing an employee move the products through the retail store.

2. The system of claim 1, wherein the user electronic device is a product scanner.

3. The system of claim 1, wherein the first model and the second model are selected also based upon whether a product is on a list of products that are being monitored.

4. The system of claim 1, wherein the indicator is obtained by scanning a shelf label.

5. The system of claim 1, wherein the features of the product comprise product brand, size, or storage arrangements.

6. The system of claim 1, wherein the features of the retail store comprise size of the retail store, location of the retail store, or store performance.

7. The system of claim 1, wherein the retail store includes product displays with shelving units.

8. The system of claim 1, wherein the plurality of machine learning models change over time.

9. A method for maintaining stock levels in a retail store by correcting over-stated perpetual inventory (PI) values, the method comprising:

providing a plurality of machine learning models including a first model and a second model, each of the machine learning models being structurally different from the others, the machine learning models being trained with different data prior to use according to an artificial neural network/backpropagation-based algorithm, a regression-based algorithm, or a decision tree-based algorithm;

wherein the first model and the second model are neural networks, the first model comprising a first structure including first layers and first weights, the second model comprising a second structure including second layers and second weights, the training being effective to physically change the first structure and the second structure, the trained first structure and the trained second structure being different and unique;

wherein the first model is trained only on first data having a first age or date, and the second model is trained only on second data having a second age or date, the first age or date and the second age or date being different providing a user electronic device that is configured to obtain an out-of-stock indicator, the out-of-stock indicator indicating that a product is out-of-stock in a retail store;

providing a database that is configured to store mapping information that maps out-of-stock indicators of the product to features of the product and features of the store, the database also storing a perpetual inventory (PI) value of the product;

at a control circuit and over a plurality of days:

receiving the out-of-stock indicator from the user electronic device and responsively determine features of the product and features of the retail store by using mapping information in the database;

at a first predetermined time:

selecting the first model from the plurality of models;

applying the determined features of the product and the features of the store to the first selected model and responsively receive a first out-of-stock probability from the selected first model, the first out-of-stock probability indicating probability that the product is actually out-of-stock;

comparing the first out-of-stock probability to a threshold;

when the first out-of-stock probability is at or above the threshold, performing an adjustment of the PI value for the product, the adjustment being effective to correct for an overstated PI condition of the product;

at a second predetermined time and when the first out-of-stock probability is below the threshold, the second predetermined time being different than and subsequent to the first predetermined time:

select the second model from the plurality of models;

apply the determined features of the product and the features of the retail store to the selected second model and responsively receive a second out-of-stock probability from the selected second model, the second out-of-stock probability indicating probability that the product is actually out-of-stock;

compare the second out-of-stock probability to the threshold;

when the second out of stock probability is at or above the threshold, perform an adjustment of the PI value for the product, the adjustment being effective to correct for an overstated PI condition of the product;

wherein the adjusted PI value is utilized to perform an action, the action being one of: re-ordering products from a distributor, the products being shipped to a retail store, and re-stocking the products at the retail store;

wherein the restocking is accomplished by using an electronic signal that is effective when applied to an automated device to control the automated device to move the products through the retail store or by instructing an employee move the products through the retail store.

10. The method of claim 9, wherein the user electronic device is a product scanner.

11. The method of claim 9, wherein the first model and the second model are selected also based upon whether a product is on a list of products that are being monitored.

12. The method of claim 9, wherein the indicator is obtained by scanning a shelf label.

13. The method of claim 9, wherein the features of the product comprise product brand, size, or storage arrangements.

14. The method of claim 9, wherein the features of the retail store comprise size of the store, location of the store, or store performance.

15. The method of claim 9, wherein the retail store includes product displays with shelving units.

16. The method of claim 9, wherein the plurality of machine learning models change over time.

\* \* \* \* \*

UNITED STATES PATENT AND TRADEMARK OFFICE
CERTIFICATE OF CORRECTION

PATENT NO. : 11,816,630 B2
APPLICATION NO. : 17/224360
DATED : November 14, 2023
INVENTOR(S) : Ying C. Yau and Zheyuan Chen It is certified that error appears in the above-identified patent and that said Letters Patent is hereby corrected as shown below:

In the Claims

In Column 13, Claim 9, Line 58, delete "different" and insert -- different; --, therefor.

Signed and Sealed this
Second Day of April, 2024

Katherine Kelly Vidal
*Director of the United States Patent and Trademark Office*